(12) United States Patent
Bergsbjörk et al.

(10) Patent No.: US 8,768,377 B2
(45) Date of Patent: Jul. 1, 2014

(54) PORTABLE ELECTRONIC DEVICE AND METHOD OF PROVIDING LOCATION-BASED INFORMATION ASSOCIATED WITH AN IMAGE

(75) Inventors: Hanna Bergsbjörk, Hjärup (SE); Lisa Winge, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/412,964

(22) Filed: Mar. 6, 2012

(65) Prior Publication Data
US 2013/0130711 A1 May 23, 2013

Related U.S. Application Data

(60) Provisional application No. 61/562,623, filed on Nov. 22, 2011.

(51) Int. Cl.
H04W 24/00 (2009.01)
H04W 4/02 (2009.01)
H04M 1/725 (2006.01)
H04N 1/00 (2006.01)

(52) U.S. Cl.
CPC ............... *H04W 4/02* (2013.01); *H04W 4/021* (2013.01); *H04M 1/72572* (2013.01); *H04M 2242/30* (2013.01); *H04N 1/00244* (2013.01)

USPC .................... 455/456.1; 340/995.1; 340/990; 701/516; 701/426; 701/408

(58) Field of Classification Search
CPC ... H04W 4/02; H04W 4/021; H04N 1/00244; H04M 1/72572; H04M 2242/30
USPC ............... 455/524, 13.1, 430, 515, 427, 12.1, 455/514; 340/7.25, 7.27, 995.24, 995.1, 340/990; 701/514, 532, 516, 426, 408; 273/254; 453/17; 382/201; 370/338
See application file for complete search history.

(56) References Cited

U.S. PATENT DOCUMENTS

| | | | | |
|---|---|---|---|---|
| 6,236,861 B1 * | 5/2001 | Naor et al. | ...... | 455/458 |
| 8,150,617 B2 * | 4/2012 | Manber et al. | ...... | 701/426 |
| 8,620,896 B2 * | 12/2013 | Soderstrom | ...... | 707/707 |
| 8,630,494 B1 * | 1/2014 | Svendsen | ...... | 382/209 |
| 2007/0195373 A1 * | 8/2007 | Singh | ...... | 358/302 |

(Continued)

*Primary Examiner* — Mahendra Patel
(74) *Attorney, Agent, or Firm* — Edwards Wildman Palmer LLP; Peter F. Corless; Steven M. Jensen (57) ABSTRACT

A portable electronic device comprises an image sensor configured to capture at least one image. The at least one image may be output via an optical output device. A processing device is configured to retrieve geographic information associated with the at least one image, and to identify at least one contact included in a set of contacts of the portable electronic device, the at least one contact having captured at least one other image in a geographic area in which the at least one image was captured. An identifier for the at least one contact is displayed.

16 Claims, 7 Drawing Sheets

(56) References Cited

U.S. PATENT DOCUMENTS

| | | | |
|---|---|---|---|
| 2007/0214180 A1* | 9/2007 | Crawford | 707/104.1 |
| 2008/0033652 A1* | 2/2008 | Hensley et al. | 702/5 |
| 2009/0144258 A1* | 6/2009 | Taylor | 707/5 |
| 2010/0287256 A1* | 11/2010 | Neilio | 709/217 |
| 2010/0309226 A1* | 12/2010 | Quack et al. | 345/634 |
| 2011/0264527 A1* | 10/2011 | Fitzpatrick et al. | 705/14.55 |
| 2012/0196581 A1* | 8/2012 | Papakipos et al. | 455/415 |
| 2012/0272287 A1* | 10/2012 | Kuhlke et al. | 726/1 |

* cited by examiner

PORTABLE ELECTRONIC DEVICE AND METHOD OF PROVIDING LOCATION-BASED INFORMATION ASSOCIATED WITH AN IMAGE

CROSS-REFERENCES TO RELATED APPLICATIONS

This application claims priority to U.S. Provisional Application No. 61/562,623, filed Nov. 22, 2011, the entire contents of which is incorporated herein by reference in its entirety.

FIELD OF THE INVENTION

The application relates to a portable electronic device and to a method of providing information associated with an image. The invention relates in particular to such a device and method for use in providing information when geographic information is available that relates to a location at which the image was taken.

BACKGROUND OF THE INVENTION

A variety of portable electronic devices nowadays are provided with components for capturing images. Examples of such electronic devices include portable communication devices which may include a camera. For illustration, modern mobile telephones or personal digital assistants may be equipped with a camera. With increasing data transmission bandwidths, the transmission of an image or of a video sequence which includes plural images over a mobile communication network is becoming increasingly popular. There is a wide variety of applications for transmitting images taken with a portable electronic device. In one approach, images may be received at a portable communication device before an image is captured, so as to allow the user of the portable communication device to identify a camera position and attitude which matches a viewing angle used for capturing the older image, or which is complementary with the viewing angle of the older image.

A portable communication device may also be used to download images from image libraries which are publicly accessible, for example by accessing the image library over a wide area network. Such approaches may be of limited value to a user of a portable electronic device when the user is interested in knowing whether someone he or she knows has taken an image, rather than merely retrieving an image taken by a person unknown to the user.

SUMMARY

There is a continued need in the art for a portable electronic device and for a method which address some of the above shortcomings. In particular, there is a continued need in the art for a portable electronic device and for a method which assist a user in determining whether a person he or she knows has visited the same region in which the user has captured an image, using his portable electronic device.

According to one embodiment, a portable electronic device is provided. The portable electronic device comprises an image sensor configured to capture at least one image, an optical output device, and a processing device coupled to the optical output device. The processing device is configured to retrieve geographic information associated with the at least one image. The processing device is configured to identify, based on the geographic information, at least one contact included in a set of contacts of the portable electronic device, the at least one contact having captured at least one other image in a geographic area in which the at least one image was captured. The processing device is configured to control the optical output device to display an identifier for the at least one contact.

The processing device may be configured to control the optical output device such that the identifier for the at least one contact is displayed when the captured image is displayed.

The processing device may be configured to control the optical output device such that the identifier for the at least one contact is displayed as an overlay of the captured image.

The processing device may be configured to control the optical output device such that displaying of the overlay is de-activated based on a monitored condition. The monitored condition may include a pre-defined time interval, causing the displaying of the overlay to be de-activated after expiry of the pre-defined time interval. Alternatively or additionally, the monitored condition may include a user input, causing the displaying of the overlay to be de-activated in response to a user request.

The portable electronic device may further comprise a communication interface for wireless communication configured to receive the at least one other image. The processing device may be configured to control the optical output device to display the at least one other image.

The portable electronic device may further comprise a user interface configured to receive an input defining a subset of the set of contacts. The processing device may be configured such that the at least one other image is selectively displayed, based on whether the at least one contact is included in the subset. The at least one subset may be an image sharing list defined by the user, which includes contacts with whom the user wishes to share images and associated geographic information. The at least one subset may be stored locally in the portable electronic device.

The processing device may be configured to transmit, based on the defined subset of contacts, the at least one image and the geographic information over the communication interface. The processing device may be configured to transmit the at least one image and the geographic information over the communication interface if the subset has at least one entry, indicating that there is at least one contact with whom images and associated geographic information are to be shared. The processing device may be configured such that the at least one image and associated geographic information are not transmitted if the subset is empty, indicating that the user has not defined any contact with whom images and associated geographic information are to be shared.

The communication interface may be configured to receive a notification when a contact included in the set of contacts captures the at least one other image in the geographic area. The processing device may be configured to update the identified at least one contact based on the received notification.

The processing device may be configured to retrieve second geographic information associated with at least one second image captured by the image sensor. The processing device may be configured to determine, based on the geographic information and the second geographic information, whether the at least one second image was captured in the geographic area in which the at least one image was captured. The processing device may be configured to control the optical output device based on whether the at least one second image was captured in the geographic area in which the at least one image was captured.

The portable electronic device may further comprise a position determining device configured to automatically determine geo location information in response to the image sensor capturing the at least one image. The processing device may be configured to identify the at least one contact based on the geo location information. The geo location information may include a pair of geographic coordinates.

A size of the geographic area may depend on the geographic information. The geographic area may be larger if the at least one image is captured in a larger city, and may be smaller if the at least one image is captured in a smaller city. The size of the geographic area and/or the variation in size of the geographic area may be set in a user-defined manner. The portable electronic device may have a user interface allowing the user to adjust the size of the geographic area. The portable electronic device may be configured such that the user can adjust the geographic area to have varying size, depending on the respective location. For illustration, the user may be allowed to set the geographic area to represent a street level in the user's home town, while the geographic area may correspond to a city level or even larger geographic areas for other parts of the world, as defined by the user setting.

The processing device may be configured such that an identifier for the at least one contact is displayed when the at least one contact has captured the at least one other image in the same city, in which the user has previously captured the at least one image.

The identifier for the at least one contact may include a name of the at least one contact. The identifier for the at least one contact may include a telephone number or electronic address of the at least one contact.

According to one embodiment, a method of providing location-based information associated with an image is provided. The method comprises capturing, by an image sensor of the portable electronic device, at least one image. The method comprises retrieving geographic information associated with the at least one image. The method comprises identifying, based on the geographic information, at least one contact included in a set of contacts of the portable electronic device, the identified at least one contact having captured at least one other image in a geographic area in which the at least one image was captured. The method comprises displaying an identifier for the at least one contact.

The identifier for the at least one contact may be displayed as an overlay of the captured image.

The method may further comprise monitoring a condition, and deactivating displaying of the overlay based on a result of the monitoring. The monitored condition may include a pre-defined time interval, causing the displaying of the overlay to be deactivated after expiry of the pre-defined time interval. Alternatively or additionally, the monitored condition may include a user input, causing the displaying of the overlay to be de-activated in response to an associated user input.

The method may further comprise displaying the at least one other image based on whether the at least one contact is included in a user-defined subset of the set of contacts. The at least one subset may be an image sharing list defined by the user, which includes contacts with whom the user wishes to share images and associated geographic information. The at least one subset may be stored locally in the portable electronic device.

The method may further comprise selectively transmitting, based on the subset, the at least one image and associated geographic information.

The method may further comprise receiving a notification when another contact included in the set of contacts captures the at least one other image in the geographic area in which the at least one image was captured, and displaying an identifier for the other contact when the at least one image is displayed.

The identifier for the at least one contact may be selectively displayed based on whether the at least one contact has captured the at least one other image in the same city where the at least one image was captured.

The method may be performed by the portable electronic device of any aspect or embodiment of the invention.

According to yet another embodiment, there is provided a non-transitory storage medium storing instruction code which, when executed by a processor of a portable electronic device, directs the portable electronic device to perform the method of any one aspect or embodiment.

According to one embodiment, a method of providing location-based information associated with an image is provided. The method comprises receiving, by a computing device, a first image captured by a first portable electronic device and first geographic information associated with the first image. The method comprises receiving, by the computing device, a second image captured by a second portable electronic device and second geographic information associated with the second image. The method comprises determining whether the first geographic information and the second geographic information correspond to locations which are both located in the same geographic area. The method comprises selectively transmitting, based on a result of the determining, data indicative of the second portable electronic device to the first portable electronic device.

The method may further comprise evaluating a first picture sharing setting of the first portable electronic device and a second picture sharing setting of the second portable electronic device, and selectively transmitting, based on a result of the evaluating, the second image to the first portable electronic device.

The method may be performed by a computing device located in a core network of a mobile communication network, or interfaced with a node of the core network.

The portable electronic devices and method of various embodiments allow geographic information to be taken into account in picture sharing. When viewing an image on a portable electronic device, information may be selectively provided about friends who have taken images in the same geographic area. A user may be provided with information on which ones of his or her friends have taken photos in the same geographic area in which the user has taken a photo.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and advantages of the invention will become apparent from the following detailed description when read in conjunction with the accompanying drawings, in which like reference numerals refer to like elements.

DETAILED DESCRIPTION OF EMBODIMENTS

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection or coupling between functional blocks, devices, components or other physical or functional units shown in the drawings or described herein may also be implemented by an indirect connection or coupling. Functional blocks may be implemented in hardware, firmware, software or a combination thereof.

The features of the various embodiments may be combined with each other, unless specifically noted otherwise.

A portable electronic device and methods of providing location-based information associated with images captured by an image sensor of the portable electronic device will be described. The portable electronic device has an image sensor configured to capture an image, or a series of images forming a video sequence. Geographic information associated with the image is determined. The geographic information may be determined automatically when the image is captured. The geographic information may be provided as geotag information, which is associated with the image. When an image having associated geotag information is displayed on a display of the portable electronic device, information on contacts of the portable electronic device which have captured other images in the same geographic area may be displayed. The information may include names of the contacts and, optionally, also a representation of the other images captured by these contacts. The contacts may be stored in a phonebook or other contact directory of the portable electronic device. Details of contacts may be selectively displayed only when the user of the portable electronic device activates a setting, indicating that the user also is willing to share is own images and associated geographic information with the respective contacts.

As will be explained in more detail, the portable electronic devices and methods of embodiments allow picture sharing to be performed, taking into account both information on a list of contacts in one or several portable electronic devices and geographic information associated with captured images. Additional information, such as information on boundaries of a city, may be taken into account in the processing to determine whether two images were captured in the same city. A user may automatically be provided with information on which ones of his or her friends have also captured photos or videos in the geographic area in which a photo that is being displayed was captured.

Figure 1:
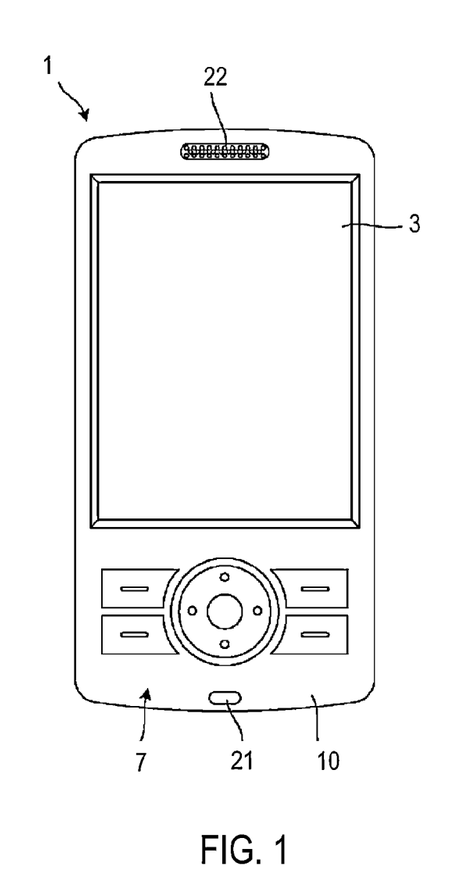
FIG. 1 is a front view of a portable electronic device according to one embodiment.
Figure 2:
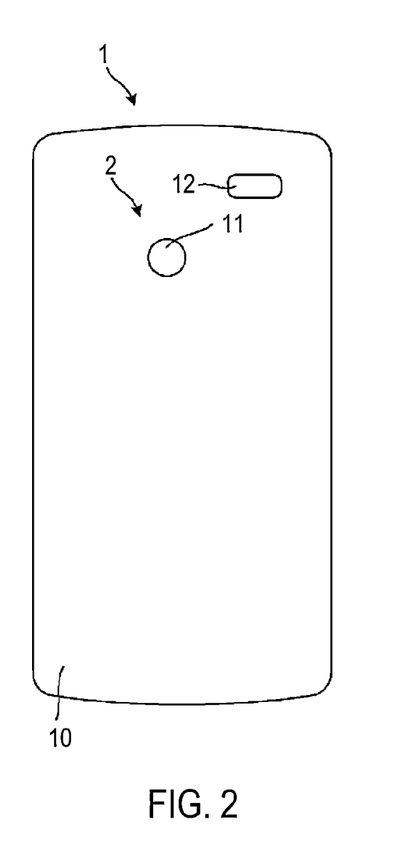
FIG. 2 is a rear view of the portable electronic device.
Figure 3:
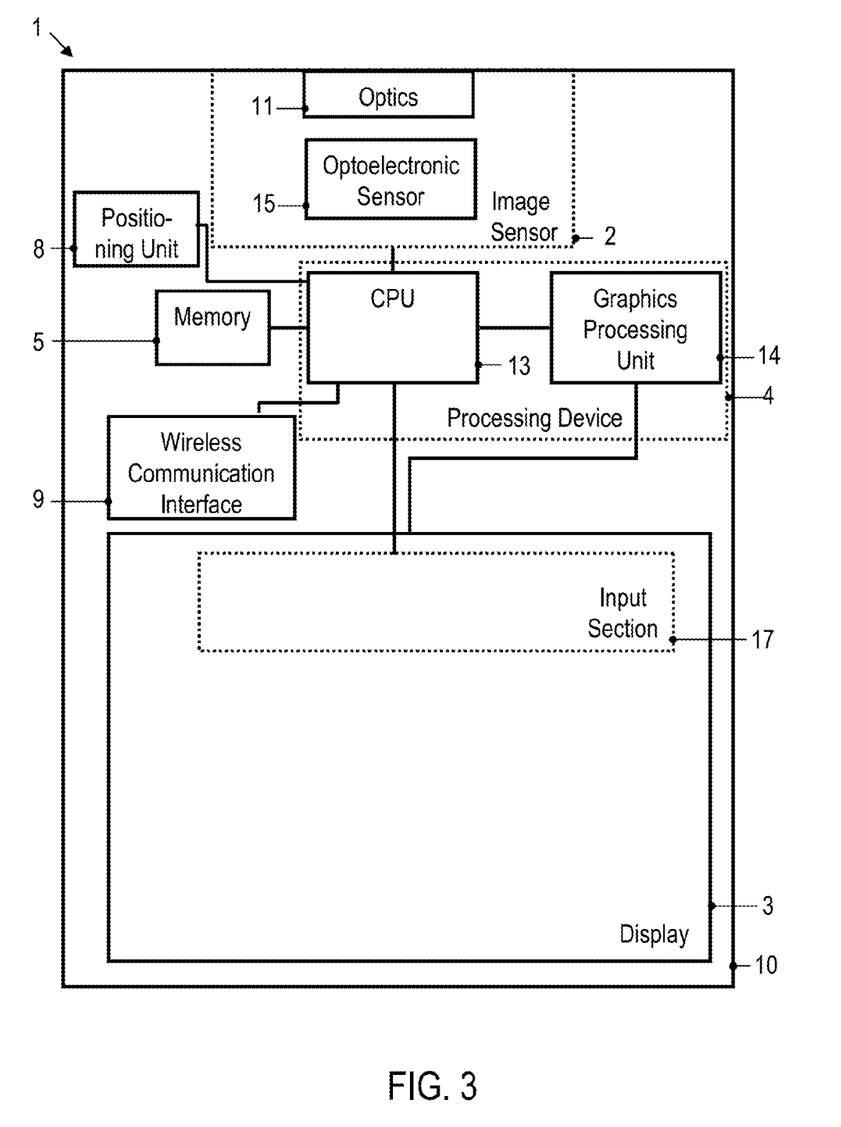
FIG. 3 is a schematic block diagram of the portable electronic device of FIGS. 1 and 2.

FIG. 1 is a front view of a portable electronic device 1, FIG. 2 is a rear view of the portable electronic device 1, and FIG. 3 is a schematic block diagram representation of the portable electronic device 1. The portable electronic device 1 includes an image sensor 2, a display 3 and a processing device 4 coupled to the image sensor 3 and to the display 3. The processing device 4 may be one processor or may include plural processors, such as a main processor 13 and a graphics processing unit 14. The processing device 4 may perform processing and control operations. When an image captured with the image sensor 2 is to be displayed after it was captured, the processing device 4 may determine whether geographic information is available for the image which indicates the location at which the image was taken. The geographic information may have any one of a variety of formats, such as geo coordinates, a cell identifier for a cell of a cellular network, or an identifier for a city in which the image was captured. If geographic information is available, the processing device 4 may determine whether one or several contacts included in a set of contacts has also captured another image in the same geographic area. The set of contacts that is stored in the portable electronic device 1. If at least one of the contacts stored in the portable electronic device 1 has captured another image in the same geographic area, an identifier for that contact may be shown as an overlay at least when the image is displayed for the first time. The identifier may be a name of the contact, which may be stored locally in the portable electronic device 1. Other identifiers may be used, such as a telephone number or other electronic address of the contact. The processing device 4 may control the display 3 such that the identifier of the contact is displayed selectively only when that contact has activated an option, indicating that he or she is willing to share images and associated geographic information with the portable electronic device 1. The processing device 4 may control the display 3 such that the identifier of the contact is further displayed selectively only when the user of the portable electronic device 1 has activated an option, indicating that he or she is also willing to share images and associated geographic information with the contact who has captured another image in the same region.

The set of contacts may be stored locally in the portable electronic device, e.g. in a non-volatile memory 5 or other storage device. User-defined settings specifying with which ones of the contacts a user is willing to share captured images and associated geographic information may also be stored in the memory 5. When external devices participate in determining whether images captured by two portable electronic devices were captured in the same geographic area (e.g. within the same city), and/or whether each one of the two portable electronic devices has agreed to share images and associated geographic information with the respectively other portable electronic device, the processing device 4 may communicate some of the data stored in the memory 5 over a wireless communication interface 9. For illustration, the processing device 4 may retrieve information on the contacts of the portable electronic device 1 with whom captured images and associated geographic information may be shared, and may communicate this information to a server over the wireless communication interface 9. When the settings stored in the memory 5 indicate that there is at least one contact with whom images and associated geographic information may be shared, the processing device 4 may retrieve at least the geographic information and may transmit the geographic information over the wireless communication interface 9. The processing device 4 may also retrieve the respective image and may transmit the image over the wireless communication interface 9.

Geographic information may be determined automatically when an image is captured. A positioning unit 8 may determine geographic information when the image sensor 2 captures an image. The geographic information may have any one of a variety of formats. The geographic information may be a pair of geo coordinates. The positioning unit 8 may include a GPS receiver, a Galileo receiver, or any other positioning componentry adapted to determine geo coordinates. Alternatively or additionally, the geographic information may include a cell identifier identifying a cell of a mobile communication network, in which cell the portable electronic device 1 is located when the image is captured. Alternatively or additionally, the geographic information may include an identifier for a city in which the portable electronic device 1 is located when the image is captured. When the user activates an option to determine the geographic information when an image is captured, the geographic information may be determined automatically. The captured image may be "geotagged", i.e., the geographic information may be assigned to and may be stored in association with the captured image. When the captured image is to be displayed on the display 3, the processing device 4 may retrieve the geographic information associated with the captured image, and may selectively control the display 3 such that an identifier for a contact is output to indicate that the contact has captured another image in the same geographic area.

The image sensor 2 of the portable electronic device 1 may include various components of a digital camera. The image sensor 2 may include a focusing optics 11. The image sensor 2 includes an optoelectronic sensor 15 which performs image sampling, to convert an optical image into image data. The image sensor 2 may include additional components, such as a flashing unit 12, an illumination sensor, or similar.

The portable electronic device 1 may be operative as a portable communication device, e.g. a cellular telephone, a personal digital assistant, or similar. The portable electronic device 1 may include components for voice communication, which may include a microphone 21, a speaker 22, and the wireless communication interface 9 for communication with a wireless communication network. The portable electronic device 1 may have a manually operable user interface. The user interface may include function and control keys 7 provided on a housing 10 of the portable electronic device, and/or a touch- or proximity-sensitive input section 17 of the display 3.

With reference to FIG. 4 to FIG. 10, the operation of the portable electronic device 1 will be explained in more detail.

An image or a series of images captured by the image sensor 2 of the portable electronic device 1 may be stored in the non-volatile memory 5 or another storage device. The images may be stored as geotagged image, which have geographic information associated with them. The geographic information may be stored in the same file as the image, e.g. as an attribute, or may be stored in a separate file.

When the image is retrieved for displaying, information may be displayed which indicates which contacts stored in a contact list (e.g. a phonebook) of the portable electronic device 1 have captured another image in the geographic area in which the displayed image was captured. These contacts may be identified using a message exchange with an entity of a mobile communication network, as will be explained in more detail with reference to FIGS. 8 to 10.

Figure 4:
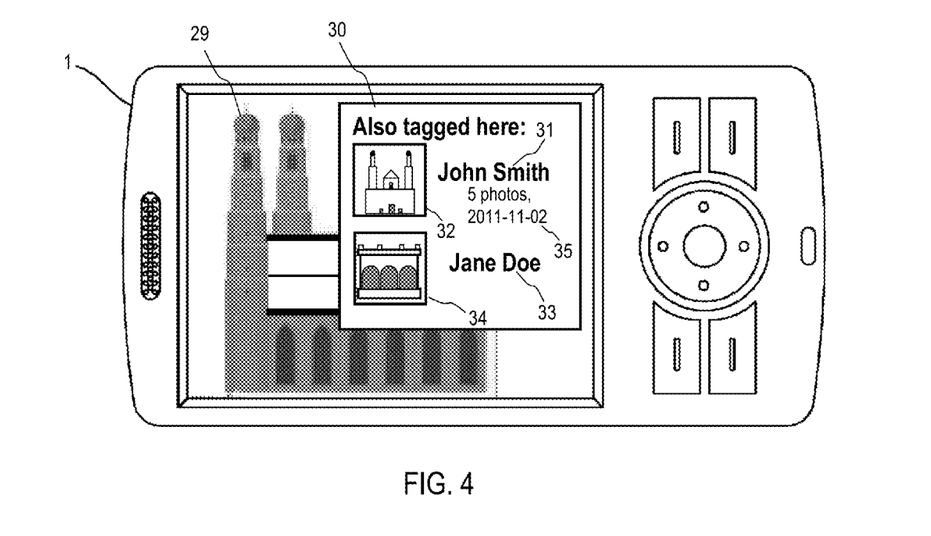
FIG. 4 is a view illustrating operation of a portable electronic device according to one embodiment.

FIG. 4 shows the portable electronic equipment 1 in a state in which a captured image 29 is displayed on the display 3. The captured image 29 is a geotagged image, for which associated geographic information is available. At least when the image 29 is displayed for the first time, an overlay 30 may be shown superimposed on the image. The overlay 30 may be displayed for a pre-determined time interval and/or until a user input is received which indicates that the overlay 30 is to be hidden.

The overlay 30 includes an identifier 31 for a first contact who has captured another image in the same geographic area in which the image 29 was captured, and at a time before the image 29 is displayed. The first contact is included in a set of contacts of the portable electronic device 1. The identifier 31 may be a name, which may be stored in a local phonebook or other directory of the portable electronic device. The other image 32 taken by the first contact may be displayed in the overlay 30. Additional information 35 may be displayed. For illustration, a count of the other images captured by the first contact in the respective geographic area may be displayed, and/or a date at which the latest one of the other images was captured by the first contact in the respective geographic area may be displayed.

The overlay 30 may include a second identifier 33 for a second contact who has captured another image in the same geographic area in which the image 29 was captured, at a time before the image 29 is displayed. The second contact is also included in a set of contacts of the portable electronic device 1. The second identifier 33 may be a name, which may be stored in a local phonebook or other directory of the portable electronic device. The other image 34 taken by the second contact may be displayed in the overlay 30. Additional information, such as a count of the other images captured by the second contact in the respective geographic area and/or a date at which the latest one of the other images was captured by the second contact in the respective geographic area may be displayed.

While the identifiers 31, 33 may be names, any other identifier may be used which identifies respectively one contact. For illustration, telephone numbers and/or other electronic addresses and/or other data may be used to uniquely identify the respective contact who has previously taken a photo in the same geographic area.

The displaying of the identifiers for contacts and/or the displaying of other images captured by these contacts may be performed selectively, based on image sharing settings activated in the portable electronic device 1. The displaying of his information may further be performed selectively based on image sharing settings activated in the portable electronic devices of the first and second contact, respectively. In some implementations, the identifier 31, 33 for a contact may be selectively displayed only if the other contact has actively selected an option indicating that he or she is willing to participate in sharing images and associated geographic information with the portable electronic device 1. The other images 32, 34 may be selectively displayed, e.g. as thumbnail images, only if the respective contact has actively selected an option indicating that he or she is willing to participate in sharing images and associated geographic information with the portable electronic device 1, and if the user of the portable electronic device 1 has actively selected an option indicating that he or she is willing to participate in sharing images and associated geographic information with the respective contact. Sharing of images and associated geographic information among contacts included in a friend list may thereby be implemented in a two-way fashion. An image captured using the portable electronic device 1 and the associated geographic information may be provided to a contact only if both the user of the portable electronic device 1 and the contact agree to share images and associated geographic information with each other, in a mutual fashion.

If the user of the portable electronic device 1 has not yet activated a setting to share geotagged images with some of his contacts, but the contacts have indicated that they are willing to share images and associated geographic information with the user of the portable electronic device 1, only the identifiers for the respective contacts may be displayed. The other images taken by the contacts may not be displayed until the user of the portable electronic device 1 activates a setting to share images with some of his contacts.

Figure 5:
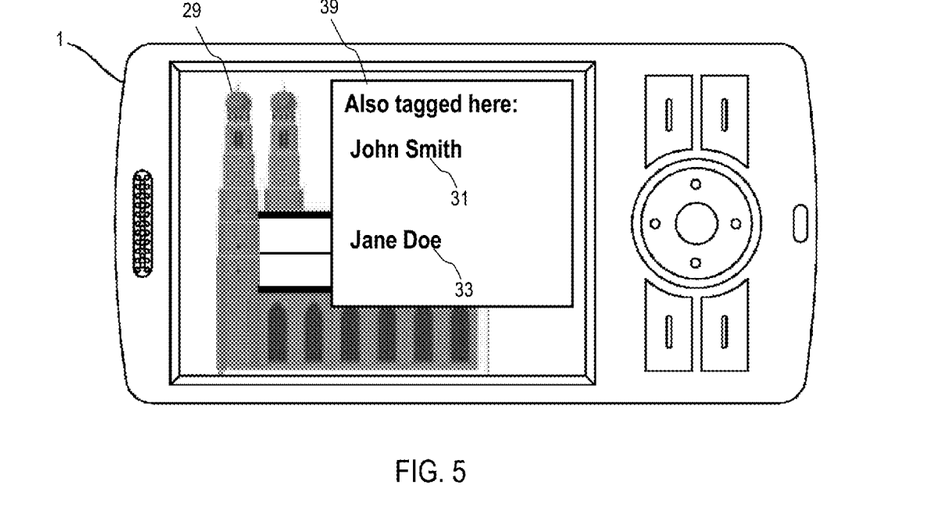
FIG. 5 is a view illustrating operation of a portable electronic device according to one embodiment.

FIG. 5 shows the portable electronic equipment 1 in a state in which a captured image 29 is displayed on the display 3. The overlay 39 which is displayed on the display 3 includes identifiers 31, 33 for contacts who have taken other images in the same geographic area, but does not show the other images taken by these contacts. The overlay 39 may be generated when the first contact, represented by identifier 31, and the second contact, represented by identifier 33, have indicated that they share images and associated geographic information with the user of the portable electronic device 1, while the user of the portable electronic device 1 has not yet activated location-based image sharing in relation to those specific contacts.

Identifiers for contacts who have respectively captured another image in the same geographic area may be displayed in various operational states of the portable electronic device 1. For illustration, when an image is captured using the portable electronic device 1, information that at least some contacts have previously captured other images in the same geographic area may be displayed, e.g. in a status bar. The identifiers for these contacts who have previously captured other images in the same geographic area may also be displayed.

In an album view, identifiers for contacts may be displayed as an overlay. The overlay may be faded out after a predetermined time interval and/or in response to a user command. In an album view, when a user flicks through images, an overlay may still be shown where information is available that a contact has taken an image in the same geographic area, but some of the content of the overlay may be hidden to reduce processing delays.

Information on contacts who have captured other images in the same geographic area may be selectively displayed, in dependence on whether an image is the first image captured in a certain geographic area, e.g. in a given city. For illustration, information on contacts who have also taken photos in that city may be displayed if the geographic information associated with an image is indicative of the fact that there is no other geotagged image stored in the portable electronic device that was taken in the same city. Displaying information on contacts may be suppressed if a second image is captured in the same geographic area by the portable electronic device 1. Update notifications may still be processed when a contact of the portable electronic device 1 subsequently takes another image in the respective geographic area. An identifier for the respective contact may be displayed on the display 3, even when the portable electronic device 1 is no longer resident in the respective area, to indicate that a friend included in a contact list has now also visited the geographic area in which an image that is being displayed was captured.

Figure 6:
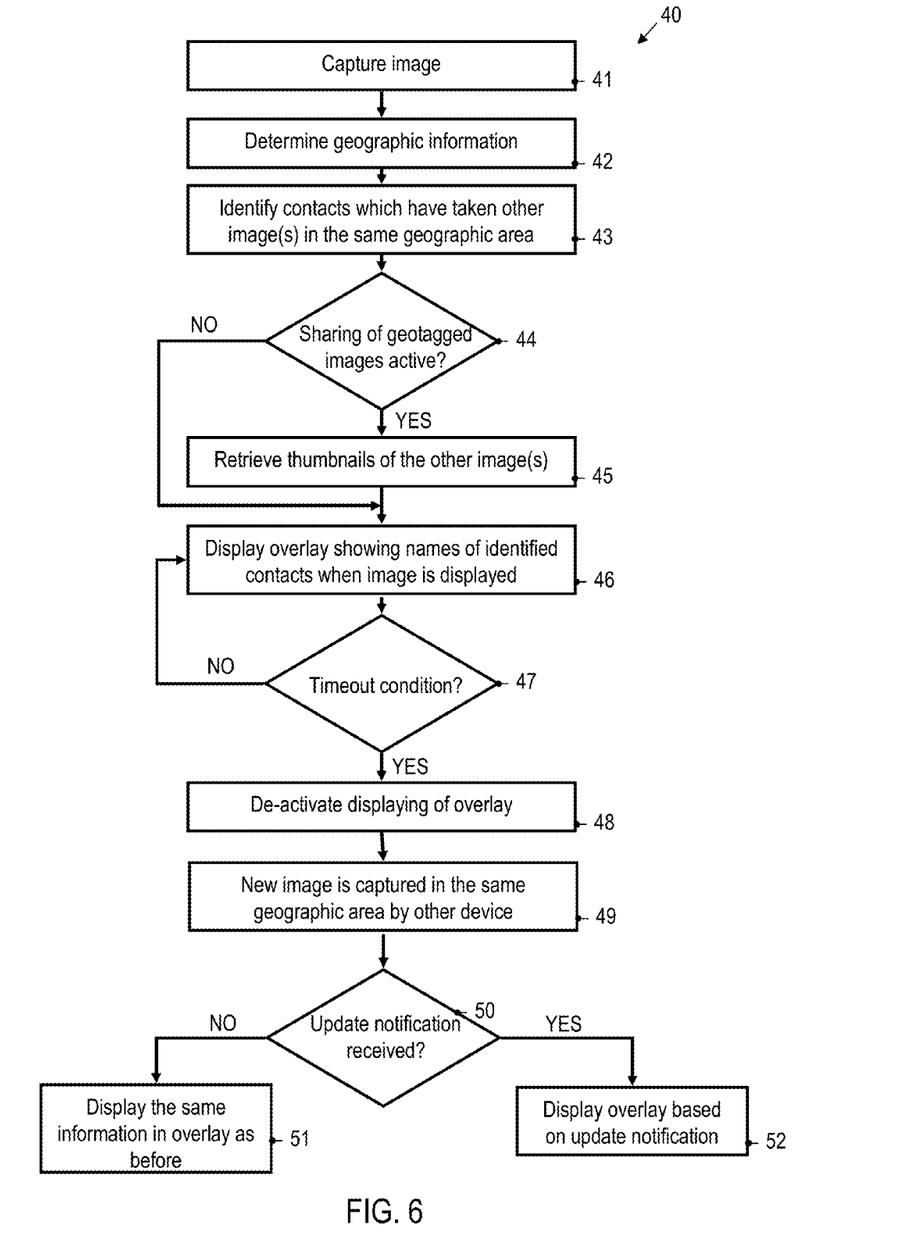
FIG. 6 is a flow chart of a method according to one embodiment.

FIG. 6 shows a flow chart of a method 40 according to one embodiment. The method 40 may be performed by the portable electronic device 1.

At 41, an image is captured. At 42, geographic information is determined. The geographic information is indicative of a position of the portable electronic device at the time at which the image was captured. The position may be determined automatically in response to an image sensor capturing the image. The image and associated geographic information may be stored in the portable electronic device. If an option to share images and associated geographic information has been activated, the image and associated geographic information may also be transmitted over a wireless communication interface of the portable electronic device. A subset of the set of contacts of the portable electronic device, with whom the user is willing to share images and associated geographic information, may also be transmitted over the wireless communication interface.

At 43, one or several contacts are identified who are included in a set of contacts of the portable electronic device, and who have captured another image in a geographic area in which the image capturing at 41 was performed. The contact(s) may be identified based on a message received at the wireless communication interface, as will be explained in more detail with reference to FIG. 9 and FIG. 10. In some implementation, identifying the contact(s) may include transmitting a message including the captured image and associated geographic information over a wireless communication interface and receiving, in response thereto, information on contacts who have taken another image in the same geographic area and who are willing to share the geotagged image with the user of the portable electronic device.

At 44, it is determined whether a setting has been activated to share images and associated geographic information. If such a setting has not yet been activated, transmission of the image captured at 41 and associated geographic information to other portable electronic devices is prevented, and the method proceeds to 46. Nevertheless, identifiers for other contacts may optionally be displayed, if those other contacts have selected to share their images and associated geographic information with the portable electronic device. If it is determined that a setting has been activated to share images and associated geographic information with the contacts who have captured other images in the same geographic area, at least thumbnail versions of these other images may be retrieved at 45. The retrieving of the other images at 45 may be performed selectively only if there is mutual agreement to share images and associated geographic information between the users of portable electronic devices.

At 46, when the captured image is displayed, identifiers for the contacts identified at 43 may be displayed. The identifiers may be displayed as an overlay, thereby showing a list of friends who have visited the same geographic area when the image is displayed. Information on the contacts identified at 43 may also be provided when the image is captured and displayed. The information may then be shown in a status bar, for example. At 47, a timeout condition is monitored. If the timeout condition is not yet met, the method returns to 46. The overlay is continued to be displayed for a predetermined time period, unless a user command is received to hide the overlay. If the timeout condition is fulfilled, the method proceeds to 48. At 48, displaying of the overlay is de-activated. The display of the portable electronic device may be controlled such that the overlay fades out.

When a second image is captured in the same geographic area, the displaying of information on contacts may be modified. For illustration, it may not be required to display a list of all contacts that have been in that geographic area, in response to capturing the second image in the same geographic area. However, if additional contacts willing to share images and associated geographic information have in the meantime captured photos in this geographic area, a corresponding notification may be displayed. This will be explained with reference to steps 49-52.

At 49, another user, who may be one of the user's contacts, captures another image in the same geographic area in which the image was captured at 41. At 50, it is determined whether an update notification was received. The update notification may be received over the wireless communication interface. The update notification indicates that, after the image was captured at 41, a contact who is willing to share images and associated geographic information captured an image in the same geographic area. The update notification may be received in real-time, i.e. within a predefined short time interval after the contact has captured the image. If no update notification was received, the method proceeds to 51. This may be the case when the other user is not willing to share images and associated geographic information. At 51, the displaying of information on contacts is suppressed, because this information was already displayed at 46. If an update notification was received, the method proceeds to 52. At 52, information is displayed to indicate the contact(s) that have in the meantime captured photos in the geographic area.

The information displayed at 52 may be provided in various ways. In one implementation, the information is displayed as a real-time notification. The information may be displayed when the user views an image. Alternatively, the information may be displayed irrespective of whether or not an image is being displayed by the portable electronic device, thereby informing the user of the portable electronic device that one of his/her contacts has captured another image in the same geographic area. Such an overlay may be generated based only on the update notification received at 51, as it is not required to include information on other contacts that have previously captured images in the same geographic area in the overlay. In another implementation, the information displayed at 52 may include information on all contacts having taken photos in the same geographic area as the photo which is being displayed to the user.

Pre-defined geographic areas may be used to determine whether contacts included in a set of contacts have been located in the geographic area in which the portable electronic device was located when capturing the image. The geographic areas may have different sizes and/or shapes. For illustration, geographic areas may be defined which correspond to boundaries of cities. Thereby, account may be taken of the fact that a user of a portable electronic device may be interested in sharing with his friends the information that an image was taken in a certain city, which was also visited by one of his friends. The geographic areas may also be defined such that they have different average sizes, depending on whether they are located close to or remote from the user's home address. For illustration, when a user lives in a city, it may be interesting for the user to learn which places in that city were visited and photographed by one of his contacts, rather than being merely alerted of the fact that one of his contacts has visited this city. The granularity at which the geographic areas are defined may be allowed to vary.

Figure 7:
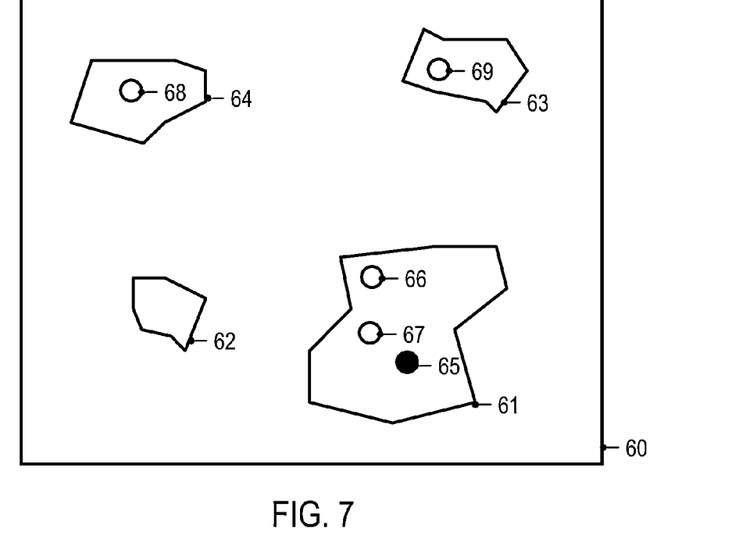
FIG. 7 is a schematic view of a map to explain location-based matching of geographic information.

FIG. 7 illustrates a portion of a map 60. Plural geographic areas 61-64 are defined. Each one of the geographic areas 61-64 may correspond to respectively one city. The union of the various geographic areas 61-64 does not need to completely cover the map 60.

A user may capture an image with his portable electronic device located at a position 65, which lies within geographic area 61. Contacts of the user have captured images at other positions 66-69. Only some positions 66, 67 of these other positions are located in the same geographic area 61 as position 65. The portable electronic device and methods of various embodiments may be used to perform a location-based filtering of geotagged images, taking into account image sharing settings of the portable electronic devices. As a result of the location-based filtering, the user of the portable electronic device who has taken the image at position 65 may be informed that some of his/her contacts have taken other images at positions 66, 67 located within the same city.

Information on the boundaries of the geographic areas 61-64 may be stored locally in the portable electronic device. In other implementations, a server separate from the portable electronic device may perform location-based matching to identify portable electronic devices which mutually share images and associated geographic information. The server may have access to data defining the geographic areas 61-64 to identify images captured in the same geographic area, e.g. in the same city.

Figure 8:
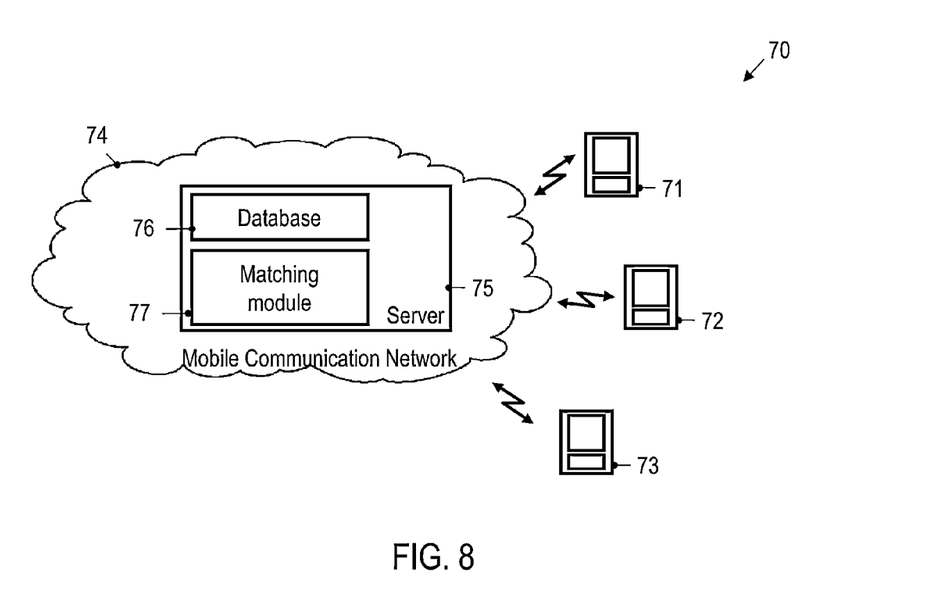
FIG. 8 is a schematic view of a communication system according to one embodiment.

FIG. 8 is a schematic view of a communication system 70. In the communication system 70, portable electronic devices 71-73 communicate with a server 75 to identify contacts who have taken images in the same geographic area as the respective portable electronic device 71-73. The portable electronic devices 71-73 communicate with a wireless mobile communication network 74 to transmit messages to or receive messages from the server 75. The server 75 which may be included in a core network of the mobile communication network 74, or which may otherwise be interfaced with a node of the mobile communication network 74, receives messages from the portable electronic devices 71-73. The messages received by the server 75 may include, for each one of the plural portable electronic devices 71-73, information on the contacts of the respective portable electronic device with which images and associated geographic information may be shared. When one of the portable electronic devices 71-73 is willing to share images and associated geographic information, it may transmit a message to the server 75 which contains at least geographic information associated with an image. The image itself may also be transmitted. For illustration, if a portable electronic device has a setting indicating that images and associated geographic information may be shared with at least one contact, the portable electronic device may transmit a captured image and the associated geographic information to the server 75.

The server 75 may have a database 76 storing images and associated geographic information. The database 76 may also include information defining, for plural portable electronic devices, identities of contacts with which images and associated geographic information may be shared.

A matching module 77 executed on the server 75 may perform a location-based matching, in response to receiving an image and associated geographic information from one of the portable electronic devices. For illustration, in response to receiving a message including a geotagged image from the portable electronic device 71, the server 75 may transmit back a response to the portable electronic device 71. The response may include information on the contacts of the portable electronic device 71 who have taken another image in the same geographic area. If, at a later point in time, the server 75 determines that another contact of the portable electronic device 71 has now also taken an image in the respective geographic area, it may automatically transmit a corresponding update notification to the portable electronic device 71.

Figure 9:
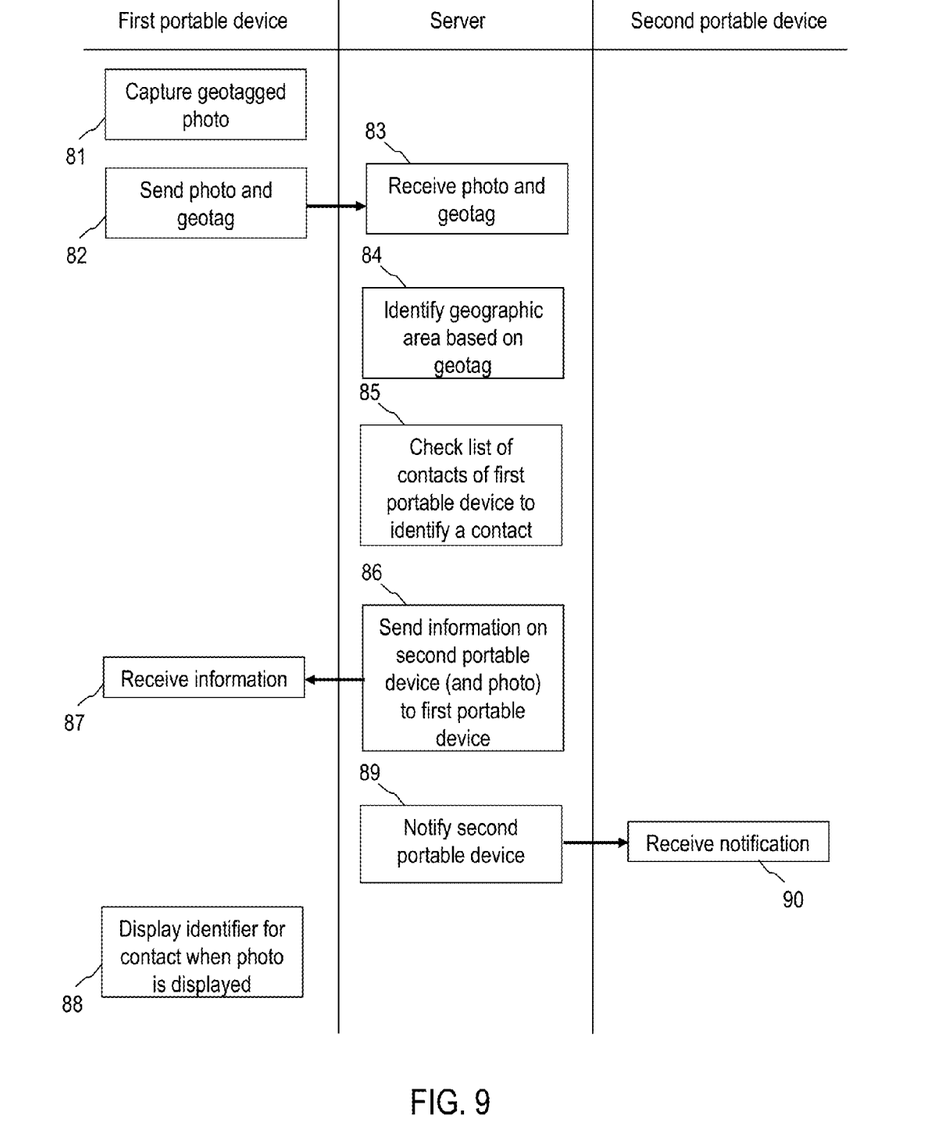
FIG. 9 shows a diagram illustrating operation of the communication system.
Figure 10:
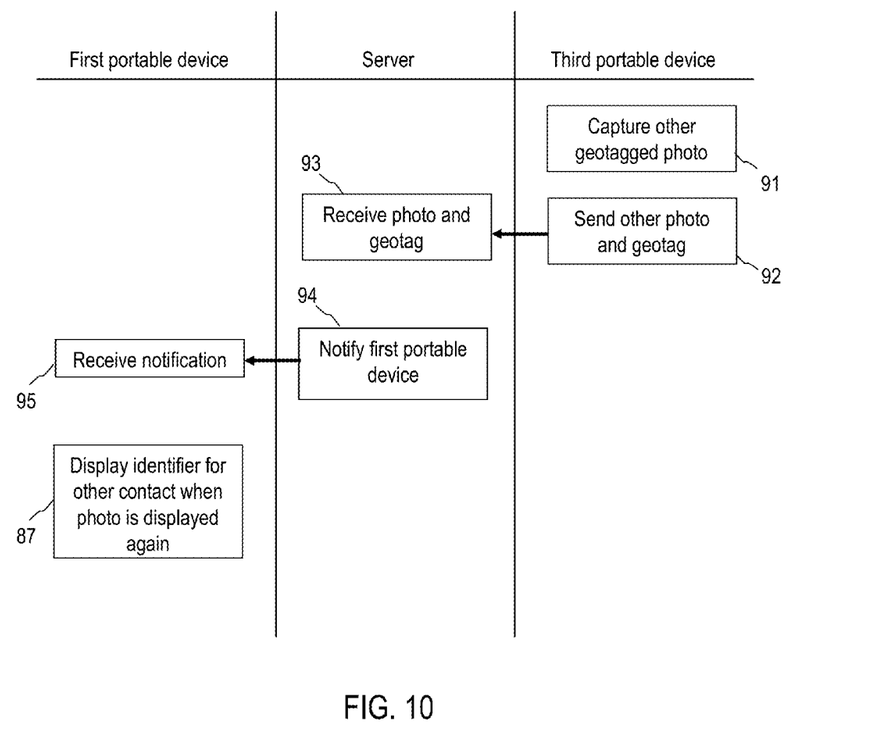
FIG. 10 shows a diagram illustrating operation of the communication system

With reference to FIG. 9 and FIG. 10, operation of a portable electronic device and of the server 75 will be explained in more detail. A first portable electronic device has a contact which corresponds to a second portable electronic device, and vice versa. The first and second portable electronic devices have respectively activated settings which allow captured images and associated geographic information to be shared between the first and second portable electronic devices.

At 81, the first portable electronic device captures a photo. The photo may be a geotagged photo. Geographic information may be automatically determined when the photo is captured, and may be associated with the captured image. The geographic information may be stored in the image file, e.g. as an attribute, or may be stored separately from the image file. If the settings of the first portable electronic device are such that images and associated geographic information are shared with at least one of its contacts, at 82 the photo and associated geographic information, e.g. a geotag assigned to the photo, is transmitted to the server.

At 83, the server receives the photo captured by the first portable electronic device and associated geographic information. At 84, the server may identify a geographic area based on the received geographic information. The geographic area may correspond to a city in which the first portable electronic device was located at the time the photo was captured. A size and shape of the geographic area may depend on the respective location represented by the geographic information. The size and shape of the geographic area may also depend on user settings. For illustration, the portable electronic device may have a user setting which allows a user to adjust the size of the geographic area as a function of location. The user setting may allow the user to specify that location matching is performed at a street level in certain areas, e.g. in his home town, but at a coarser level, e.g. city level, in other regions.

At 85, the server determines whether, in a set of contacts of the first portable electronic device, there is at least one contact who has taken a photo in the identified geographic area and who has agreed to share images and associated geographic information with the user of the first portable electronic device. Such information is available if a second portable electronic device, corresponding to a contact of the first portable electronic device, has previously transmitted a geotagged photo taken in the same geographic area. The server may determine a unique identifier for the second portable electronic device. At 86, information on the second portable electronic device, e.g. the unique identifier for the second portable electronic device, may be transmitted to the first portable electronic device. Optionally, the photo previously captured by the second portable electronic device may also be transmitted at 86. Alternatively, the photo may be transmitted to the first portable electronic device only in response to a dedicated request.

At 87, the first portable electronic device receives the information from the server. The received information indicates that the second portable electronic device, owned by a contact of the user of the first portable electronic device, has captured another photo in the same geographic area. When the photo captured at 81 is displayed at the first portable electronic device, an identifier for the respective contact may be displayed. The identifier may include a name of the respective contact. The identifier may also include any other identifier, such as a telephone number or electronic address of the contact. Additional information may be displayed, e.g. the count of photos captured by the second portable electronic device in the same geographic area, the date and/or time at which the latest one of the photos was captured, or similar. A preview of the photo captured by the second portable electronic device may also be displayed.

When the server identifies a match indicating that the first portable electronic device and the second portable electronic device have taken photos in the same geographic area, the server may also send a notification to the second portable electronic device. At 89, a notification message may be transmitted to inform the second portable electronic device that one of its contacts, i.e. the first portable electronic device, has captured a photo in a certain geographic area. At 90, the second portable electronic device receives the notification message. The second portable electronic device may use the received notification message to display an identifier for the user of the first portable electronic device when the respective photo is displayed, thereby informing the user of the second portable electronic device that the user of the first portable electronic device has taken a photo in the same geographic area.

The first portable electronic device may receive a corresponding notification if yet another, third portable electronic device owned by a contact of the first portable electronic device is used to capture another photo in the same geographic area at a later time. The notification may be received even if the first portable electronic device is no longer located in the area in which the image was captured at 81. This process is illustrated in FIG. 9, assuming that the first and third portable electronic devices have activated settings which allow images and associated geographic information to be shared between the first and third portable electronic devices.

At 91, the third portable electronic device captures a photo. The photo may be a geotagged photo, having associated geographic information. At 92, the photo and associated geographic information, e.g. a geotag assigned to the photo, are transmitted to the server. At 93, the server receives the photo and associated geographic information.

At 94, the server sends a notification message to the first portable electronic device. Thereby, the first portable electronic device is informed that one of its contacts, i.e. the third portable electronic device, has captured a photo in a certain geographic area. The notification may include information on the geographic area and/or any other information that allows the first portable electronic device to associate the notification with at least one of the captured images. At 95, the first portable electronic device receives the notification message. The first portable electronic device may use the received notification message to display an identifier for the user of the third portable electronic device when the respective photo captured at 81 is re-displayed or when another photo is taken in this specific geographic area. This allows the user of the first portable electronic device to be automatically informed when the user of the third portable electronic device has taken a photo in the same geographic area.

In the portable electronic devices, a setting to share geographic information associated with images may be activated in a user-defined manner. This can be done in various ways. For illustration, the user may select a subset of the set of contacts, with which he or she wishes to share geographic information associated with images. Group definitions may be used. For illustration, the user may select to share geographic information associated with images with contacts included in a family group, a friends group, or any subset of such a group.

The setting to share geographic information associated with images may be connected to another setting which allows automatic geotagging of images to be activated. When geotagging is activated, geographic information is automatically determined when an image is captured, and the geographic information may be stored in associated with the captured image. When automatic geotagging is activated by the user, the user may be requested to specify whether sharing of geographic information associated with images is also to be activated. Alternatively or additionally, the user may be requested to specify whether sharing of geographic information associated with images is to be activated when the user looks at a geotagged image for the first time. The request may be presented in a pop-up window, and may be flagged not to be shown again. Additionally, the setting to share geographic information associated with images may also be activated in a settings menu of the portable electronic device.

While portable electronic devices and methods of providing location-based information have been described with reference to the drawings, modifications and alterations may be implemented in further embodiments. For illustration, while identifiers for contacts may be shown as an overlay to a displayed image, the identifiers may also be shown in other ways, e.g. in a status bar which is offset from the displayed image. For further illustration, in each and every embodiment described herein, the location-based sharing between contacts may be applied to video sequences.

For further illustration, other processing may be used to identify contacts that have captured images in the same geographic area. The portable electronic device may receive information on contacts that have taken a photo and associated geographic information over the wireless communication interface, and may process the received geographic information locally to determine whether a contact has captured an image in the same region as the portable electronic device.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the appended claims.

The invention claimed is:

1. A portable electronic device connected to a server via a network, comprising:
   an image sensor configured to capture at least one image;
   an optical output device;
   a processing device coupled to the optical output device, the processing device being configured to:
      retrieve geographic information associated with the at least one image;
      identify, based on the geographic information, at least one contact included in a set of contacts of the portable electronic device, the at least one contact being associated with another portable electronic device connected to the network, the another portable electronic device having captured at least one other image in a geographic area in which the at least one image was captured; and
      control the optical output device to display on the portable electronic device an identifier for the at least one contact; and
   a communication interface for wireless communication configured to receive the at least one other image, the communication interface being further configured to receive a notification transmitted by the server when the another portable electronic device captures the at least one other image in the geographical area,
   wherein the processing device is configured to update the identified at least one contact based on the received notification, and
   the processing device is configured to control the optical output device to display the at least one other image.

2. The portable electronic device of claim 1, the processing device being configured to control the optical output device such that the identifier for the at least one contact is displayed when the captured image is displayed.

3. The portable electronic device of claim 2, the processing device being configured to control the optical output device such that the identifier for the at least one contact is displayed as an overlay of the captured image.

4. The portable electronic device of claim 3, the processing device being configured to control the optical output device such that displaying of the overlay is de-activated based on a monitored condition.

5. The portable electronic device of claim 1, further comprising:
   a user interface configured to receive an input defining a subset of the set of contacts;
   the processing device being configured such that the at least one other image is selectively displayed, based on whether the at least one contact is included in the subset.

6. The portable electronic device of claim 5, the processing device being configured to transmit, based on the defined subset of contacts, the at least one image and the geographic information over the communication interface.

7. A portable electronic device connected to a server via a network, comprising:
   an image sensor configured to capture at least one image;
   an optical output device;
   a processing device coupled to the optical output device, the processing device being configured to:
      retrieve geographic information associated with the at least one image;
      identify, based on the geographic information, at least one contact included in a set of contacts of the portable electronic device, the at least one contact being associated with another portable electronic device connected to the network, the another portable electronic device having captured at least one other image in a geographic area in which the at least one image was captured; and
      control the optical output device to display on the portable electronic device an identifier for the at least one contact; and
   a communication interface for wireless communication configured to receive the at least one other image, the communication interface being further configured to receive a notification transmitted by the server when the another portable electronic device captures the at least one other image in the geographical area,
   wherein the processing device is configured to: retrieve second geographic information associated with at least one second image captured by the image sensor; determine, based on the geographic information and the second geographic information, whether the at least one second image was captured in the geographic area in which the at least one image was captured; and control the optical output device based on whether the at least one second image was captured in the geographic area,
   the processing device being configured to update the identified at least one contact based on the received notification, and
   the processing device being configured to control the optical output device to display the at least one other image.

8. The portable electronic device of claim 1, further comprising:
   a position determining device configured to automatically determine geo location information in response to the image sensor capturing the at least one image;
   the processing device being configured to identify the at least one contact based on the geo location information.

9. The portable electronic device of claim 1, the processing device being configured such that an identifier for the at least one contact is displayed when the at least one contact has captured the at least one other image in a city in which the at least one image was captured.

10. A method of providing location-based information associated with an image, in which a portable electronic device is connected to a server via a network, the method comprising:
capturing, by an image sensor of the portable electronic device, at least one image;
retrieving geographic information associated with the at least one image;
identifying, based on the geographic information, at least one contact included in a set of contacts of the portable electronic device, the identified at least one contact being associated with another portable electronic device connected to the network, the another portable electronic device having captured at least one other image in a geographic area in which the at least one image was captured;
displaying on the portable electronic device an identifier for the at least one contact;
receiving a notification from the server when the another portable electronic device captures the at least one other image in the geographic area in which the at least one image was captured; and
displaying an identifier for the other contact when the at least one image is displayed.

11. The method of claim 10, the identifier for the at least one contact being displayed as an overlay of the captured image.

12. The method of claim 11, further comprising:
monitoring a condition; and
de-activating displaying of the overlay based on a result of the monitoring.

13. The method of claim 10, further comprising:
displaying the at least one other image based on whether the at least one contact is included in a user-defined subset of the set of contacts.

14. The method of claim 10, the identifier for the at least one contact being selectively displayed based on whether the at least one contact has captured the at least one other image in the same city where the at least one image was captured.

15. A method of providing location-based information associated with an image, in which a portable electronic device is connected to a server via a network, the method comprising:
receiving, by a computing device, a first image captured by the first portable electronic device and first geographic information associated with the first image;
receiving, by the computing device, a second image captured by a second portable electronic device and second geographic information associated with the second image, the second portable electronic device being connected to the network;
determining whether the first geographic information and the second geographic information correspond to locations which are both located in the same geographic area;
selectively transmitting, based on a result of the determining, data indicative of the second portable electronic device to the first portable electronic device;
providing a notification from the server to the second portable electronic device that the first portable electronic device has captured the first image in the same geographic area in which the second portable electronic device has captured the second image;
updating at least one contact in the second portable electronic device based on the received notification; and
displaying an identifier on the second portable electronic device that the first portable electronic device has captured the first image in the same geographic area in which the second image was captured.

16. The method of claim 15, further comprising:
evaluating a first picture sharing setting of the first portable electronic device and a second picture sharing setting of the second portable electronic device; and selectively transmitting, based on a result of the evaluating, the second image to the first portable electronic device.

* * * * *